United States Patent
Wang et al.

(10) Patent No.: US 12,292,240 B2
(45) Date of Patent: May 6, 2025

(54) HEAT EXCHANGER AND MANUFACTURING METHOD THEREOF

(71) Applicant: HANGZHOU SANHUA RESEARCH INSTITUTE CO., LTD., Hangzhou (CN)

(72) Inventors: Xinjian Wang, Hangzhou (CN); Hai Huang, Singapore (SG); Weidong Xu, Hangzhou (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 0 days.

(21) Appl. No.: 18/607,418

(22) Filed: Mar. 15, 2024

(65) Prior Publication Data

US 2024/0219123 A1    Jul. 4, 2024

Related U.S. Application Data

(63) Continuation of application No. 17/566,228, filed on Dec. 30, 2021, now abandoned.

(51) Int. Cl.
*F28D 7/16*    (2006.01)
*B23K 1/00*    (2006.01)
(Continued)

(52) U.S. Cl.
CPC .......... *F28D 7/1684* (2013.01); *B23K 1/0012* (2013.01); *F28F 9/18* (2013.01); *F28F 9/268* (2013.01); *B23K 2101/14* (2018.08)

(58) Field of Classification Search
None
See application file for complete search history.

(56) References Cited

U.S. PATENT DOCUMENTS

| | | |
|---|---|---|
| 2008/0156472 A1 | 7/2008 | Maucher et al. |
| 2009/0294111 A1 | 12/2009 | Larouche et al. |

(Continued)

FOREIGN PATENT DOCUMENTS

| | | |
|---|---|---|
| CN | 101010553 A | 8/2007 |
| CN | 101031714 A | 9/2007 |

(Continued)

OTHER PUBLICATIONS

FR-2969269-A1 English machine translation (Year: 2012).*
FR-3049049-A1 English machine translation (Year: 2017).*

*Primary Examiner* — Jenna M Maroney
(74) *Attorney, Agent, or Firm* — Cheng-Ju Chiang (57) ABSTRACT

A heat exchanger includes a main body portion and a cover. The main body portion includes a heat exchange core, a collecting pipe portion and a first mounting shell. The collecting pipe portion includes a first collecting pipe portion and a second collecting pipe portion. Both the first collecting pipe portion and the second collecting pipe portion are provided with mounting end plates. Two ends of the first mounting shell are hermetically connected to the mounting end plates by brazing. The first mounting shell encloses part of the heat exchange core in a circumferential direction. Two ends of the cover are hermetically connected to the mounting end plates by bonding. The cover and the first mounting shell are arranged in an enclosing manner in the circumferential direction. The heat exchanger improves stability and reliability. A manufacture method of the heat exchanger is also disclosed.

17 Claims, 7 Drawing Sheets

(51) Int. Cl.
*B23K 101/14* (2006.01)
*F28F 9/18* (2006.01)
*F28F 9/26* (2006.01)

(56) References Cited

U.S. PATENT DOCUMENTS

2015/0251282 A1 9/2015 Angermann et al.
2019/0063849 A1 2/2019 McDonnell et al.

FOREIGN PATENT DOCUMENTS

| | | | |
|---|---|---|---|
| CN | 101031769 A | 9/2007 | |
| CN | 102459839 A | 5/2012 | |
| CN | 103857972 A | 6/2014 | |
| CN | 104215109 A | 12/2014 | |
| CN | 104251634 A | 12/2014 | |
| CN | 106687761 A | 5/2017 | |
| CN | 106813517 A | 6/2017 | |
| CN | 107120871 A | 9/2017 | |
| CN | 206487570 U | 9/2017 | |
| CN | 107864666 A | 3/2018 | |
| CN | 109425254 A | 3/2019 | |
| CN | 109997008 A | 7/2019 | |
| CN | 111692900 A | 9/2020 | |
| EP | 2014892 A1 | 1/2009 | |
| FR | 2969269 A1 * | 6/2012 | ............. F02M 26/32 |
| FR | 3049049 A1 * | 9/2017 | ......... F28D 1/05325 |
| JP | 2000-55585 A | 2/2000 | |
| JP | 2008-275246 A | 11/2008 | |
| JP | 5670522 B2 | 2/2015 | |
| WO | 2010/146063 A1 | 12/2010 | |
| WO | 2019/108950 A1 | 6/2019 | |

* cited by examiner

HEAT EXCHANGER AND MANUFACTURING METHOD THEREOF

CROSS-REFERENCE TO RELATED APPLICATIONS

This patent application is a continuation application of U.S. patent application Ser. No. 17/566,228, filed on Dec. 30, 2021, which is a bypass continuation of International Application No. PCT/CN2020/116978, filed on Sep. 23, 2020, which claims priority to Chinese Patent Application No. 201910947967.3, filed on Sep. 30, 2019, the entire content of which is incorporated herein by reference.

TECHNICAL FIELD

The present disclosure relates to a technical field of heat exchange, and in particular, to a heat exchanger and a manufacturing method thereof.

BACKGROUND

In the related art, a heat exchanger in a heat exchange system is used as a device for exchanging heat between two fluids. The heat exchanger includes a heat exchange core, an outer shell, a collecting pipe, etc. Mostly, various components of the heat exchanger are sealed and connected by a brazing process. However, in the related art, the components of the heat exchanger will be sent into a brazing furnace as a whole after being assembled, with the heat exchange core being enclosed by the outer shell and the collecting pipe, which is unbeneficial to the heating effect of the heat exchange core, and leads to poor brazing and sealing effect of the heat exchange core itself and poor brazing and sealing effect between the heat exchange core and its brazed components, resulting in that leakage is prone to occur, and the reliability of the heat exchanger is poor.

SUMMARY

The present disclosure provides a heat exchanger and a manufacturing method thereof, which is beneficial to improve the product reliability of the heat exchanger.

On one hand, the present disclosure provides a heat exchanger, configured to exchange heat between a refrigerant and a coolant, including: a main body portion, including: a heat exchange core, a collecting pipe portion and a first mounting shell; the heat exchange core including at least one heat exchange tube, the heat exchange tube having a tube inner channel and a tube wall enclosing the tube inner channel; the collecting pipe portion including a first collecting pipe portion and a second collecting pipe portion, the first collecting pipe portion and the second collecting pipe portion being located on two sides of the heat exchange core along a length direction of the heat exchange core, respectively; each of the first collecting pipe portion and the second collecting pipe portion including a mounting end plate; the mounting end plate of the first collecting pipe portion and the mounting end plate of the second collecting pipe portion being hermetically connected to the heat exchange tube by brazing; the tube inner channel of the heat exchange tube being in communication with an inner cavity of the first collecting pipe portion and an inner cavity of the second collecting pipe portion so as to form a refrigerant path to circulate the refrigerant; the first mounting shell being of an integrally U-shaped configuration; the first mounting shell including a first connecting wall and two first side walls; the two first side walls extending from two sides of the first connecting wall, respectively, along a height direction of the heat exchange core; the first mounting shell including a first accommodating space and a first opening communicating with the first accommodating space; the first accommodating space being jointly formed by the first connecting wall and the two first side walls; the heat exchange core being received in the first accommodating space; two ends of the first mounting shell along the length direction of the heat exchange core being hermetically connected to the mounting end plate of the first collecting pipe portion and the mounting end plate of the second collecting pipe portion, respectively, by brazing; and a cover, assembled to the first mounting shell to cover the first opening; wherein two ends of the cover along the length direction of the heat exchange core being hermetically fixed to the mounting end plate of the first collecting pipe portion and the mounting end plate of the second collecting pipe portion, respectively, by glue; two sides of the cover, extending along the length direction of the heat exchange core, being hermetically fixed to the first mounting shell by glue; the cover and the first mounting shell being fixed in an enclosing manner along a circumferential direction of the heat exchange core; wherein the first mounting shell, the cover, the mounting end plate of the first collecting pipe portion and the mounting end plate of the second collecting pipe portion jointly form an inner chamber in which the heat exchange core resides; and wherein the heat exchanger further includes an inlet and an outlet; the inlet, the inner chamber and the outlet are in communication to form a second path to circulate the coolant, such that the refrigerant and the coolant are capable of exchanging heat.

On the other hand, the present disclosure also provides a manufacturing method of the heat exchanger, including following steps:

providing the heat exchange core, the first collecting pipe portion, the second collecting pipe portion and the first mounting shell; inserting one end of the heat exchange tube in the length direction of the heat exchange tube into an insertion hole provided on the mounting end plate of the first collecting pipe portion; inserting the other end of the heat exchange tube in the length direction into an insertion hole provided on the mounting end plate of the second collecting pipe portion; and arranging the first mounting shell in close contact with the heat exchange core along the length direction of the heat exchange core;

fixing the heat exchange core, the first collecting pipe portion, the second collecting pipe portion and the first mounting shell as a whole by brazing; and after the brazing is done, providing the cover and hermetically fixing the cover to the first mounting shell, the mounting end plate of the first collecting pipe portion and the mounting end plate of the second collecting pipe portion by glue.

For the heat exchanger, the heat exchange core, the collecting pipe portion and the first mounting shell are all fixed by brazing, and the first mounting shell surrounds a part of the heat exchange core along the circumferential direction of the heat exchange core, which is beneficial to ensure that temperature of the first mounting shell close to an inner side of the heat exchange core is in consistent with temperature of the first mounting shell far from an outer side of the heat exchange core when the heat exchange core, the collecting pipe portion and the first mounting shell are fixed by brazing, and thereby improving the connection quality among the heat exchange core, the collecting pipe portion and the first mounting shell. The cover is fixed with the mounting end plate of the collecting pipe portion and the first mounting shell by bonding, respectively, which is beneficial to improve connection quality between the cover and the mounting end plate and that between the cover and the first mounting shell, so as to be beneficial to improve stability and reliability of the whole heat exchanger.

DETAILED DESCRIPTION

In order to make the objectives, technical solutions and advantages of the present disclosure clearer, the following further describes the present disclosure in detail with reference to the accompanying drawings and embodiments. It should be understood that the specific embodiments described here are only used to explain the present disclosure, and are not used to limit the present disclosure.

The heat exchanger provided in the present disclosure may be used in a heat exchange system, and the heat exchanger may be used as an evaporator, a condenser, an intermediate heat exchanger, or the like.

As shown in FIGS. 1 to 11, the heat exchanger provided in the present embodiment includes a main body portion 11 and a cover 12.

The main body portion 11 includes a heat exchange core 100, a collecting pipe portion and a first mounting shell 301 which are brazed as a whole.

Figure 3:
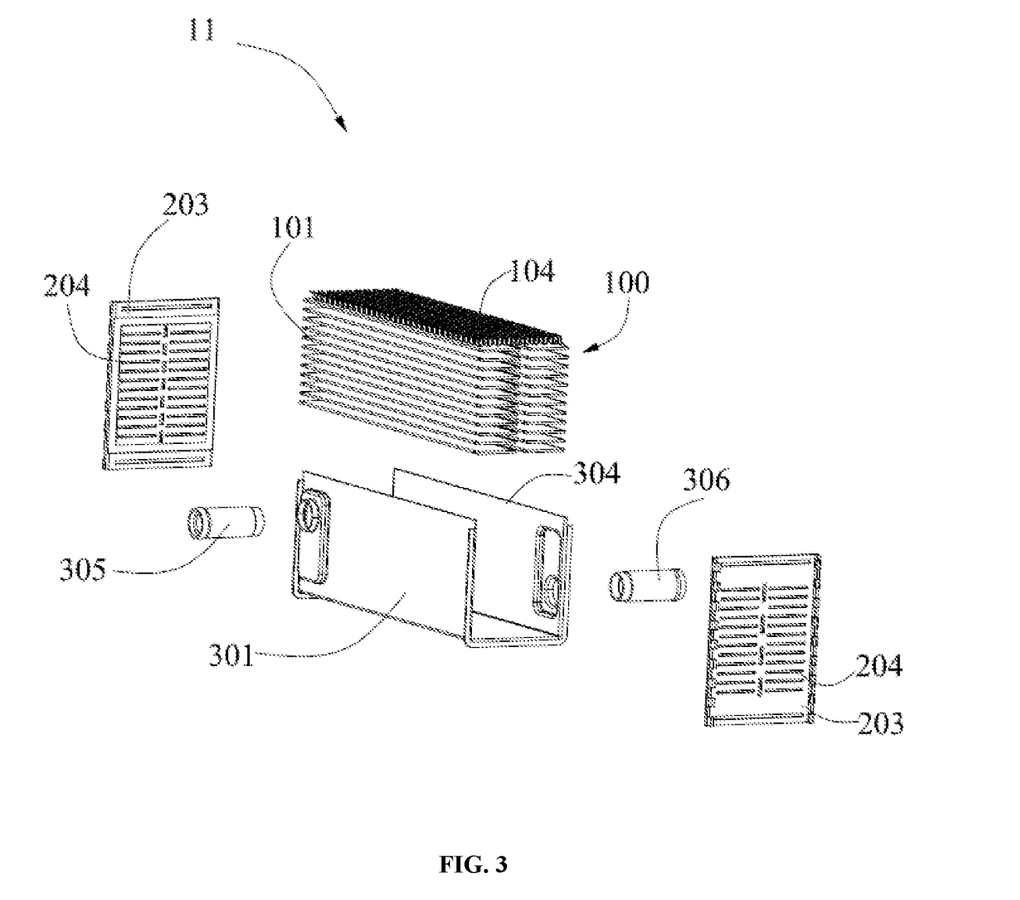
FIG. 3 is a structural exploded view of the main body portion in FIG. 2 of the present disclosure.
Figure 4:
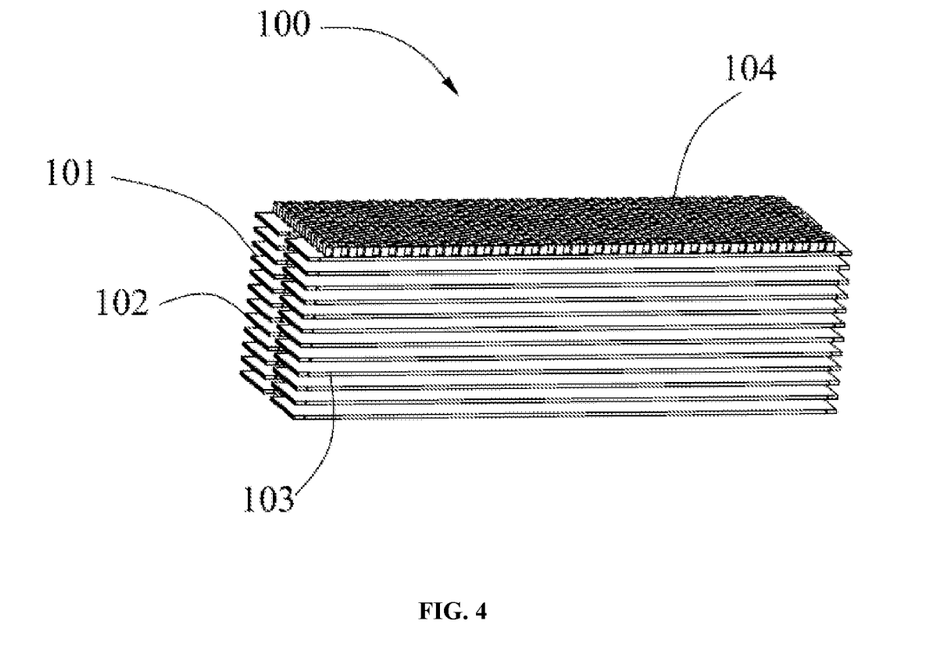
FIG. 4 is a schematic structural view of a heat exchange core provided by an embodiment of the present disclosure.

The heat exchange core 100 includes at least one heat exchange tube 101. Each of the heat exchange tube 101 has at least one tube inner channel 102 and a tube wall 103 located on a periphery of the tube inner channel 102. The heat exchange tube 101 may be a circular tube, an elliptical tube, or a microchannel flat tube. In related implementations of the present disclosure, exemplarily, the heat exchange tube 101 is a microchannel flat tube. When there are multiple heat exchange tubes 101, the multiple heat exchange tubes 101 may be arranged at intervals with each other. In the exploded view of the main body portion 11 shown in FIG. 3, multiple heat exchange tubes 101 are distributed in two rows in a width direction of the heat exchange core 100. Each row of the heat exchange tubes 101 are arranged at intervals from each other. Referring to FIG. 4, the heat exchange core 100 may further include at least one heat sink 104. When there are multiple heat sinks 104, the heat sinks 104 and the heat exchange tubes 101 may be arranged alternately. That is, each heat sink 104 is laid in a row above or below the heat exchange tube 101 adjacent to the heat sink 104. The use of the heat sink 104 can enhance the heat transfer effect of the fluid in the heat exchange tube 101. In FIGS. 3 and 4, a case in which only one heat sink 104 exists is shown. In actual products, there may be multiple heat sinks 104. The heat sinks 104 and the heat exchange tubes 101 are fixed by brazing. The above-mentioned heat sink 104 may be a fin, or other heat dissipation structure which is capable of realizing heat transfer. The above-mentioned heat sink 104 may be an integral structure or a combined structure. The overall structure of the heat exchange core 100 may be a cuboid structure.

The heat exchange core 100, the collecting pipe portion and the first mounting shell 301 are fixed as an integral structure by brazing. The heat exchange core 100 composed of multiple heat exchange tubes 101 and/or heat sinks 104, the collecting pipe portion and the first mounting shell 301 are sent into a brazing furnace for brazing as a whole. Of course, the heat exchange core 100 composed of the multiple heat exchange tubes and/or fins, the collecting pipe portion, and the first mounting shell 301 may also be brazed for multiple times. For example, firstly, the heat exchange core 100 is brazed with the collecting pipe portion, and then is secondly brazed with the first mounting shell.

Figure 2:
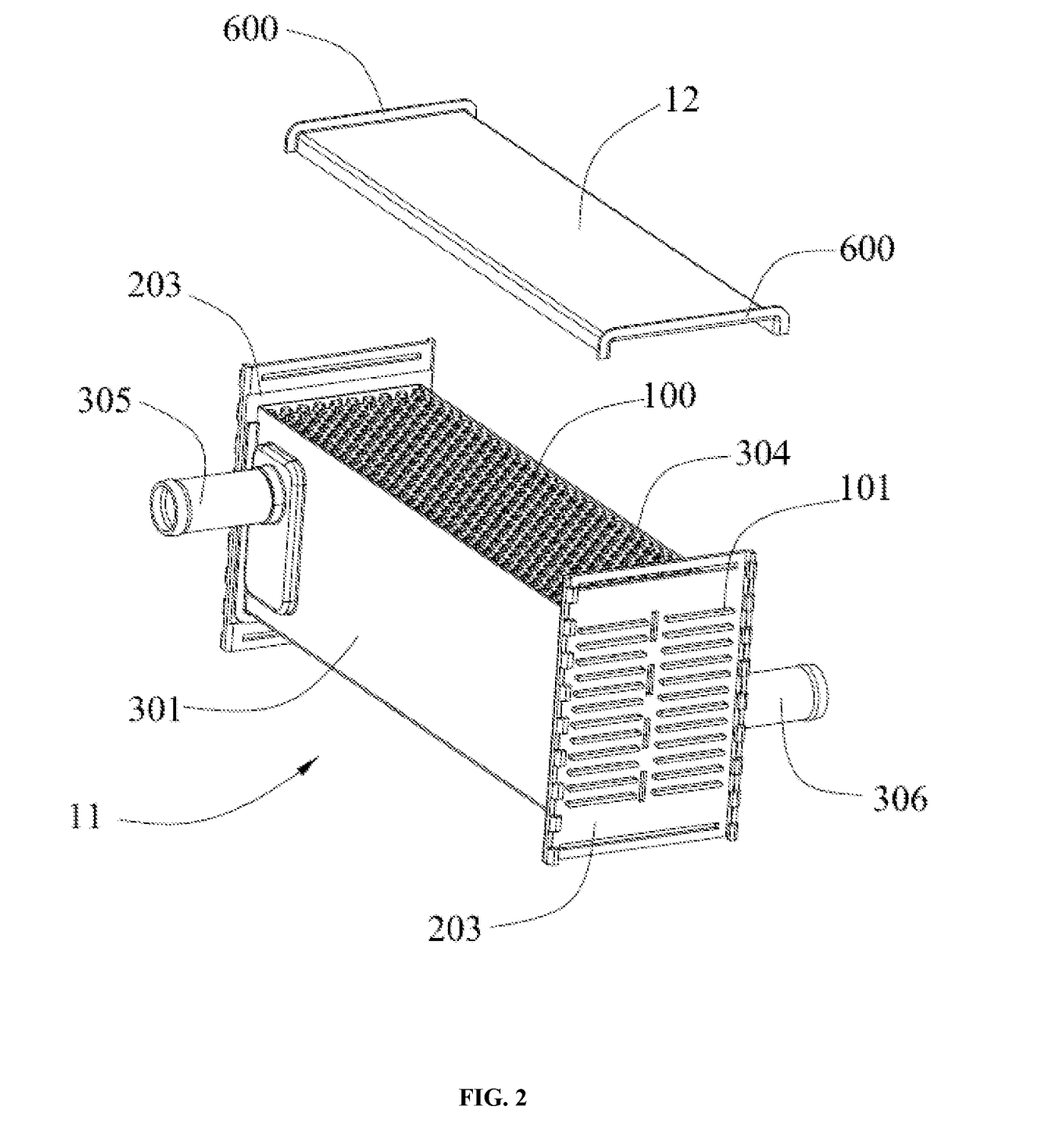
FIG. 2 is a schematic structural exploded view of a main body portion and a cover of the heat exchanger provided by the embodiment of the present disclosure.

The collecting pipe portion includes a first collecting pipe portion 201 and a second collecting pipe portion 202 disposed on two sides in a length direction of the heat exchange core 100. Each of the first collecting pipe portion 201 and the second collecting pipe portion 202 has a mounting end plate 203 for fixed installation with the heat exchange tube 101. The mounting end plate 203 is provided with an insertion hole 204 adaptable to the heat exchange tube 101. Referring to FIG. 2, FIG. 3 and FIG. 4, in the insertion hole 204, the mounting end plate 203 and the tube wall 103 of the heat exchange tube 101 may be hermetically and fixedly connected by brazing. The tube inner channel 102 of the heat exchange tube 101 is communicated with an inner cavity of the first collecting pipe portion 201 and an inner cavity of the second collecting pipe portion 202. At least part of flow area for a first medium to flow is formed together by the tube inner channel 102, the inner cavity of the first collecting pipe portion 201, and the inner cavity of the second collecting pipe portion 202 jointly.

The first collecting pipe portion 201 may be formed by fixing multiple plates as a whole by brazing after splicing. Similarly, the second collecting pipe portion 202 may also be formed by fixing multiple plates as a whole by brazing after splicing. The mounting end plate 203 is one of the multiple plates, or a part of area of a plate body of one of the multiple plates.

Figure 1:
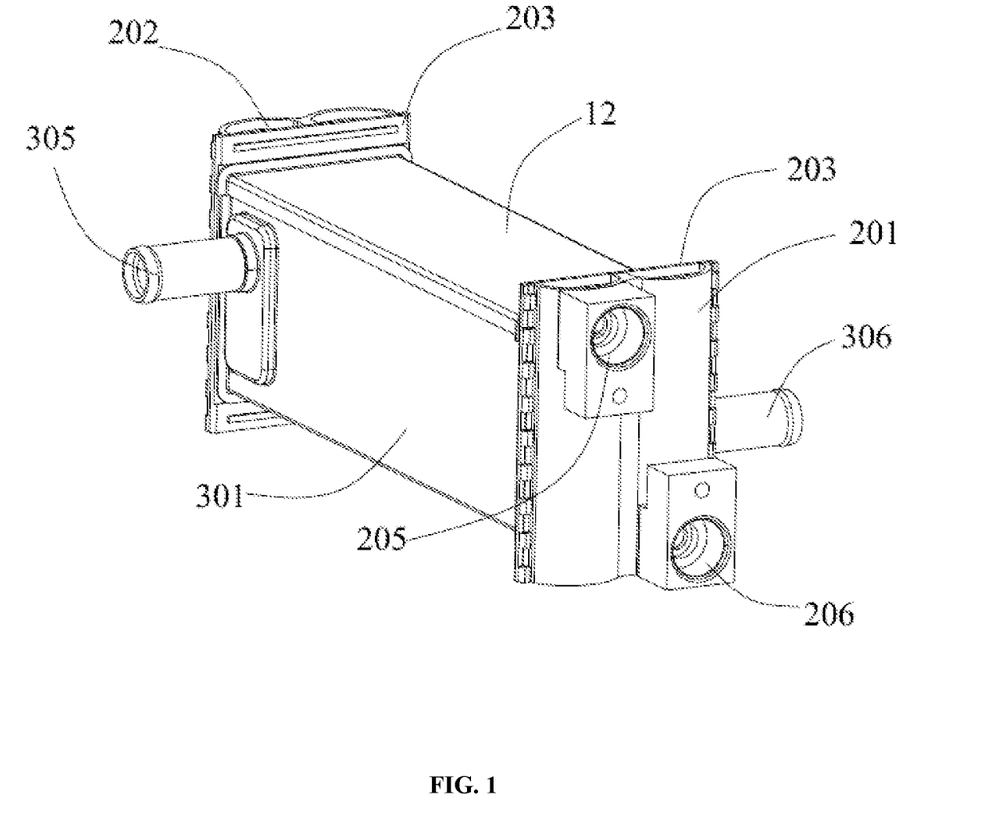
FIG. 1 is a schematic structural perspective view of a heat exchanger provided by an embodiment of the present disclosure.

The first medium may be a refrigerant. In FIG. 1, in order to realize the communication between the first medium and outside of the heat exchanger, the collecting pipe portion may further include a first inlet pipe portion 205 and a first outlet pipe portion 206. One collecting pipe portion of the first collecting pipe portion 201 and the second collecting pipe portion 202, for example, the first collecting pipe portion 201, may be used for inflow and outflow of the first medium at the same time. The inner cavity thereof may be provided with, for example, a baffle structure, so that an inlet and an outlet of the first collecting pipe portion 201 are not directly communicated. The second collecting pipe 202 is not provided with inlet and outlet functions. The fluid flows into the inner cavity of the first collecting pipe portion 201 through the first inlet pipe portion 205 of the first collecting pipe portion 201, and then flows into the inner cavity of the second collecting pipe portion 202 through the tube inner channels 102 of the heat exchange tubes 101 on one side of the heat exchange core 100 in the width direction. After flowing through the tube inner channels 102 of the plurality of heat exchange tubes 101, the fluid converges at the second collecting pipe portion 202, and enters the tube inner channels 102 of the heat exchange tubes 101 on the other side of the heat exchange core 100 in the width direction. Then, the fluid enters the inner cavity of the first collecting pipe portion 201, and finally flows out of the heat exchanger from the first outlet pipe portion 206 of the first collecting pipe portion 201. Of course, the first collecting pipe portion 201 may be used for the inflow of the first medium, and the second collecting pipe portion 202 may be used for the outflow of the first medium. That is, the first collecting pipe portion 201 may include the first inlet pipe portion 205, and the second collecting pipe portion 202 may include the first outlet pipe portion 206, on which the present disclosure does not define too much limitations. The first inlet pipe portion 205 and the first outlet pipe portion 206 may be integrally formed with other structures of the collecting pipe portion; or may be assembled and combined, and then fixed as a whole by brazing, or hermetically fixed by other connection methods.

The first mounting shell 301 is combined and fixed with the heat exchange core 100 along the length direction of the heat exchange core 100 by brazing, and two ends of the first mounting shell 301 in the length direction of the heat exchange core 100 are hermetically connected to the mounting end plates 203 by brazing. The first mounting shell 301 and the mounting end plates 203 are combined to form a first accommodating area having a first opening 304. The first opening 304 is disposed toward the cover 12. At least part of the heat exchange core 100 may be placed in the first accommodating area through the first opening 304.

The cover 12 closes the first opening 304. The cover 12 and the first mounting shell 301 are hermetically connected in the length direction of the heat exchange core 100. The specific sealing manner may be that the cover 12 and the first mounting shell 301 are hermetically connected by bonding. Two ends of the cover 12 in the length direction of the heat exchange core 100 are hermetically connected to the mounting end plate 203. The specific sealing manner may be that the cover 12 and the mounting end plate 203 are hermetically connected by bonding. The cover 12 and the first mounting shell 301 form an outer shell enclosing the heat exchange core 100 along a circumferential direction of the heat exchange core 100. In other words, the outer shell and the mounting end plate 203 form an inner space capable of accommodating the at least part of the heat exchange core 100 in the circumferential direction of the heat exchange core 100. The outer shell and the mounting end plate 203 enclose at least part of the flow area for a second medium to flow. In simple terms, the first mounting shell 301 wraps most of sides of the heat exchange core 100 in the circumferential direction of the heat exchange core 100, and the cover 12 wraps remaining side the heat exchange core 100 in the circumferential direction of the heat exchange core 100.

The second medium may be a coolant, such as an aqueous glycol solution. In FIG. 1, in order to realize the communication between the second medium and the outside of the heat exchanger, the heat exchanger may further include a second inlet pipe portion 305 and a second outlet pipe portion 306. The second inlet pipe portion 305 and the second outlet pipe portion 306 may be located on opposite sides of the outer shell. The first mounting shell 301 may be provided with an opening for communicating with the second inlet pipe portion 305 and an opening for communicating with the second outlet pipe portion 306. The second inlet pipe portion 305 may also be welded, or integrally formed, with the first mounting shell 301. The second outlet pipe portion 306 may also be welded, or integrally formed, with the first mounting shell 301.

In the structure shown in FIG. 1, the second medium may enter the heat exchanger from the second inlet pipe portion 305. The first medium flows in the heat exchange tube 101. The second medium exchanges heat with the first medium by partition walls, and finally flows out of the heat exchanger from the second outlet pipe portion 306.

Figure 5:
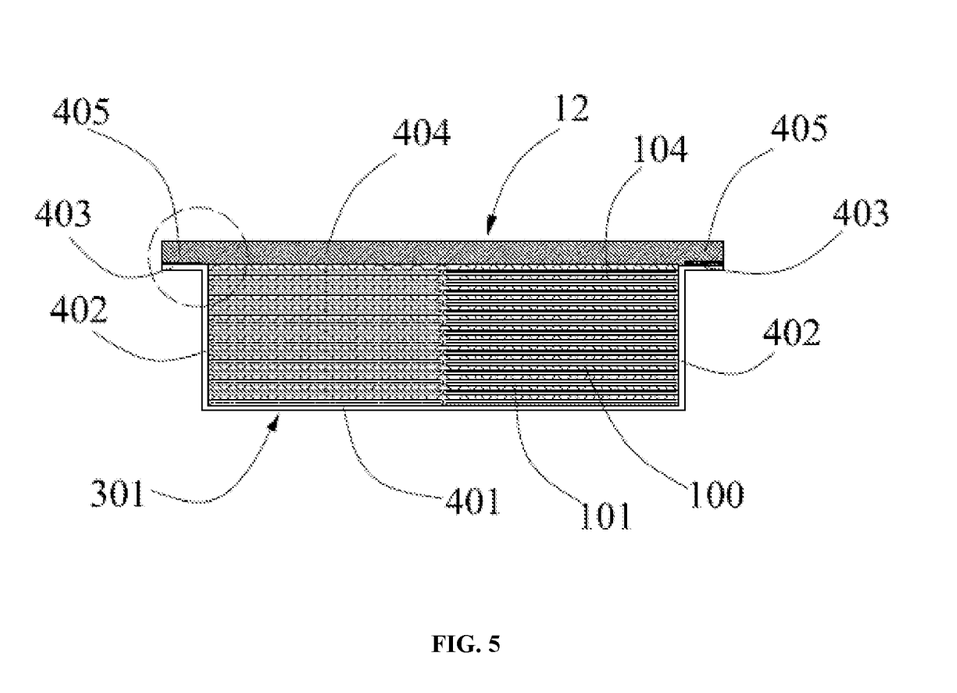
FIG. 5 is a schematic view of a connection structure of a first mounting shell and a cover provided by an embodiment of the present disclosure.

As shown in FIG. 5, in a specific implementation provided by the present disclosure, the first mounting shell 301 is connected to the cover 12, the first mounting shell 301 includes a first connecting wall 401 and two first side walls 402 opposite to each other. The two first side walls 402 are connected to the first connecting wall 401 along the length direction of the heat exchange core 100, and the two first side walls 402 are distributed on two opposite sides of the first connecting wall 401. The first side wall 402 extends from the first connecting wall 401 along a height direction of the heat exchange core. In other words, the first side wall 402 extends in a direction perpendicular to a plane where the first connecting wall 401 is located. The first mounting shell 301 is substantially a shell with a U-shaped cross section.

The heat exchange tube 101 is a microchannel flat tube. The heat exchange tube 101 has multiple channels arranged side by side. The width direction of the heat exchange tube 101 is substantially parallel to the first connecting wall 401. Correspondingly, the multiple channels of each of the heat exchange tube 101 are arranged in a direction parallel to the first connecting wall 401.

Figure 6:
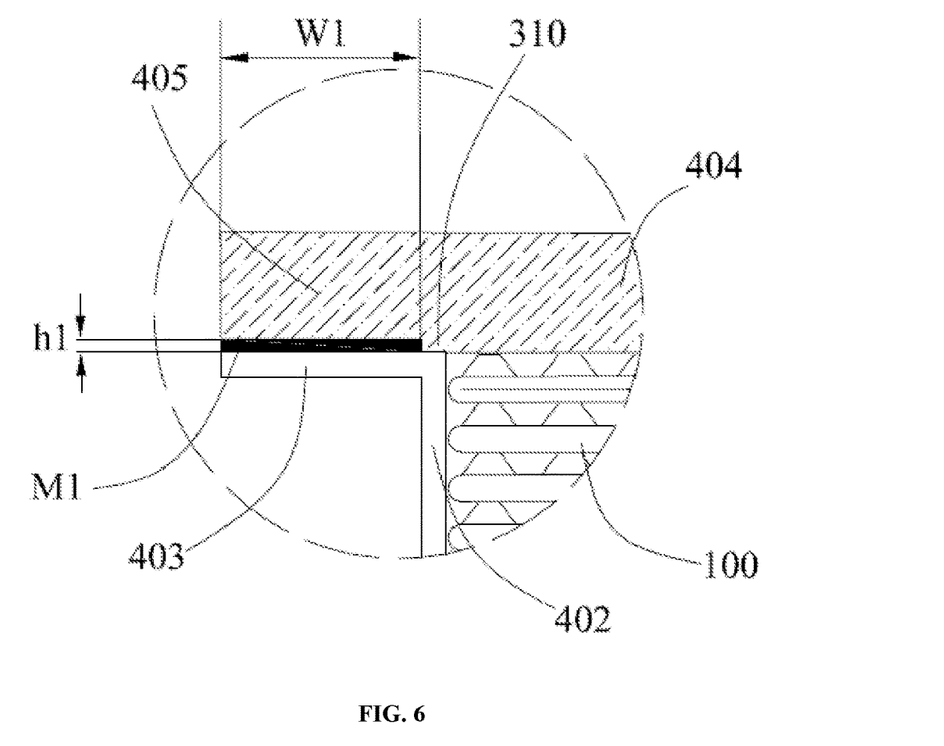
FIG. 6 is an enlarged view of a circled portion shown in FIG. 5 of the present disclosure.

Further referring to FIGS. 5 and 6, the first mounting shell 301 further includes a first flange portion 403 connected to an end of the first side wall 402. The first flange portion 403 is perpendicular to the first side wall 402, and extends in a direction away from the heat exchange core 100.

The cover 12 includes a second connecting wall 404 and two extension portions 405 connected to the second connecting wall 404. The two extension portions 405 extends toward two opposite sides of the second connecting wall 404 in the width direction, respectively. The first connecting wall 401 and the second connecting wall 404 are at least partially arranged opposite to each other. At least part of the heat exchange core 100 is located between the first connecting wall 401 and the second connecting wall 404. The extension portion 405 and the first flange portion 403 are at least partially arranged opposite to each other along the height direction of the heat exchange core. The extension portion 405 and the first flange portion 403 are fixed by bonding, so that the cover 12 and the mounting end plate 203 are hermetically connected in the length direction of the heat exchange core 100.

Furthermore, as shown in FIG. 6, the enlarged schematic view of the partial structure of FIG. 5, the side of the cover 12 facing the heat exchange core 100 is further provided with a first boss 310. In the width direction of the heat exchange core 100, the size of the first boss 310 is larger than the size of the first opening 304. Two sides of the first boss 310 in the width direction of the heat exchange core 100 are in contact with the two first flange portions 403, respectively. A first adhesive area is formed by at least part of the extension portion 405 corresponding to outer periphery of the first boss 310. For the glue, refer to the black filled area between the extension portion 405 and the first flange portion 403 in FIG. 6. The glue is indicated by M1. The glue M1 may be coated on the first adhesive area. In the first adhesive area, the extension portion 405 and the first flange portion 403 are adhered. Of course, the glue may also be coated on at least part of surface of the first flange portion 403 facing the extension portion 405, or, the first adhesive area of the extension portion 405 and at least part of surface of the first flange portion 403 facing the extension portion 405 are both coated with the glue. The heat exchange core 100 is connected with the top of the first boss 310 by direct contact, or by bonding. The first boss 310 may be fix the heat exchange core 100 so as to improve the stability of the heat exchanger.

The height h1 of the first boss 310 is 0.1 mm to 1 mm, and in some implementations, 0.3 mm to 0.5 mm may be selected. The arrangement of the first boss 310 ensures the gluing thickness of the glue. That is, the thickness of the glue M1 may be 0.1 mm to 1 mm, and in some implementations, may be 0.3 mm to 0.5 mm. At the same time, the first boss 310 also has a function of preventing the glue from overflowing into a cavity where the heat exchange core 100 is located. Along the extension direction away from the second connecting wall 404, the width W1 of the adhesive area is greater than or equal to 3 mm. That is, the width of the glue M1 is greater than or equal to 3 mm. The relatively large bonding surface size is beneficial to improve the reliability of the bonding of heat exchanger products.

Figure 7:
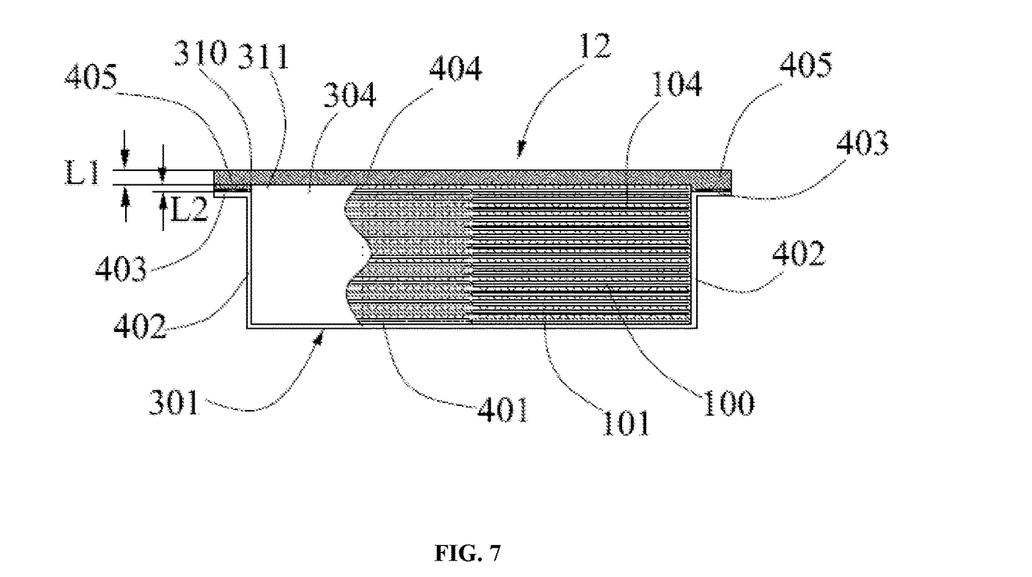
FIG. 7 is a second schematic view of the connection structure of the first mounting shell and the cover provided by an embodiment of the present disclosure.

In order to expand the space of the heat exchange core 100 in the outer shell, as shown in FIG. 7, a recessed portion 311 is provided in the middle of the first boss 310. The recessed portion 311 is recessed from an end in the convex direction of the first boss 310 along a direction away from the heat exchange core 100. An opening of the recessed portion 311 is opposite to the first opening 304. In the recessed portion 311, the heat exchange core 100 and the cover 12 is connected with the side of the heat exchange core 100 by direct contact, or by bonding. On one hand, the recessed portion 311, which has a positioning and fixing effect on the heat exchange core 100, is beneficial to improve the stability of the heat exchanger product, and on the other hand, is beneficial to expand the space of the cavity for accommodating at least part of the heat exchange core 100, which is beneficial to the miniaturization of heat exchanger products.

A distance L1 between a bottom of the recessed portion 311 and a side of the cover 12 away from the heat exchange core 100 is greater than a distance L2 between the bottom of the recessed portion 311 and a top of the first boss 310. By ensuring that the recessed portion 311 of the cover 12 is not too deep, and that a side of the cover 12 facing the heat exchange core 100 have a certain thickness as much as possible, the stability of the connection between the cover 12 and the heat exchange core 100 can be improved, and the connection strength between the cover 12 and the first mounting shell 301 can be improved.

Figure 8:
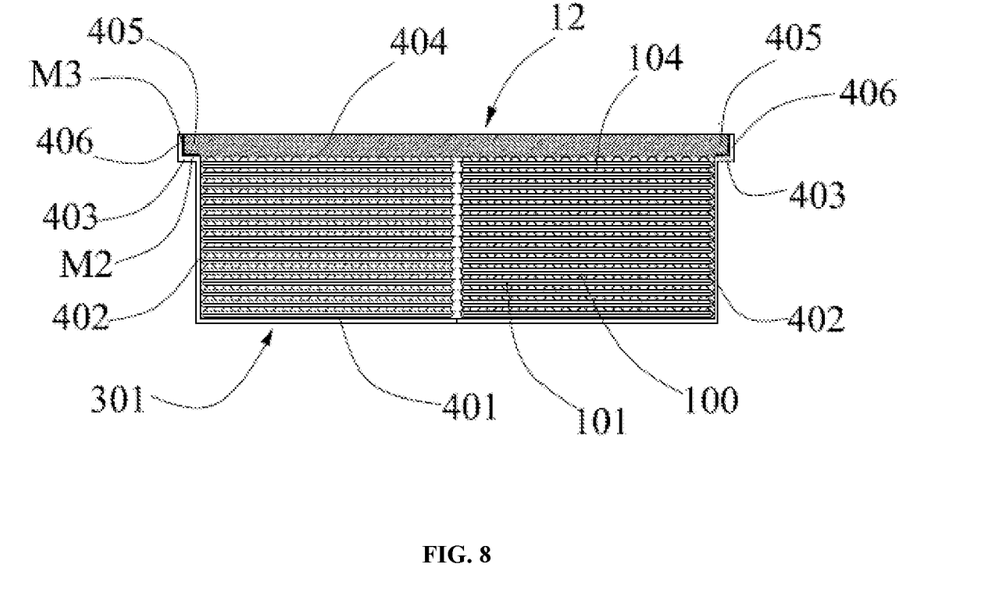
FIG. 8 is a third schematic view of the connection structure of the first mounting shell and the cover provided by an embodiment of the present disclosure.

In other implementations, as shown in FIG. 8, the first mounting shell 301 further includes a second flange portion 406 connected to an end of the first flange portion 403. The second flange portion 406 is perpendicular to the first flange portion 403, and extends in a direction away from the heat exchange core 100. The second flange portion 406 is opposite to the side wall of the extension portion 405. The first flange portion 403 and the second flange portion 406 are substantially arranged in L-shaped. A second adhesive area is formed by at least part area of the extension portion 405 corresponding to outer periphery of the first boss 310. The glue attached to the second adhesive area is marked as M2. The glue M2 may be coated on the second adhesive area, or may be coated on a surface of the first flange portion 403 facing the second adhesive area. The extension portion 405 and the first flange portion 403 are adhesively connected by glue M2. A third adhesive area is formed by at least part area of the side wall of the extension 405. The glue attached to the third adhesive area is marked as M3. The glue M3 may be coated on the third adhesive area, or may be coated on a surface of the second flange portion 406 facing the third adhesive area. The extension portion 405 and the second flange portion 406 are adhesively connected by glue M3. The glues M2 and M3 may refer to the black filled area between the extension portion 405 and the second flange portion 406 in FIG. 8.

In order to ensure a reliable connection between the cover 12 and the first mounting shell 301, the sum of the width of the second adhesive area and the width of the third adhesive area needs to be greater than or equal to 3 mm. That is, the sum of the widths of the glue M2 and the glue M3 is greater than or equal to 3 mm. The relatively large bonding surface size is beneficial to improve bonding reliability of heat exchanger products. In addition, by bonding the first flange portion 403 and the second flange portion 406 and the extension portion 405 in different directions, the bonding strength between the cover 12 and the first mounting shell 301 can be effectively improve, and the size of the extension portion 405 along its extension direction can be shorten, so that the cover 12 may be made as small as possible under the premise of ensuring the reliable connection with the first mounting shell 301, which is beneficial to optimize installation space occupied by the heat exchanger.

Figure 9:
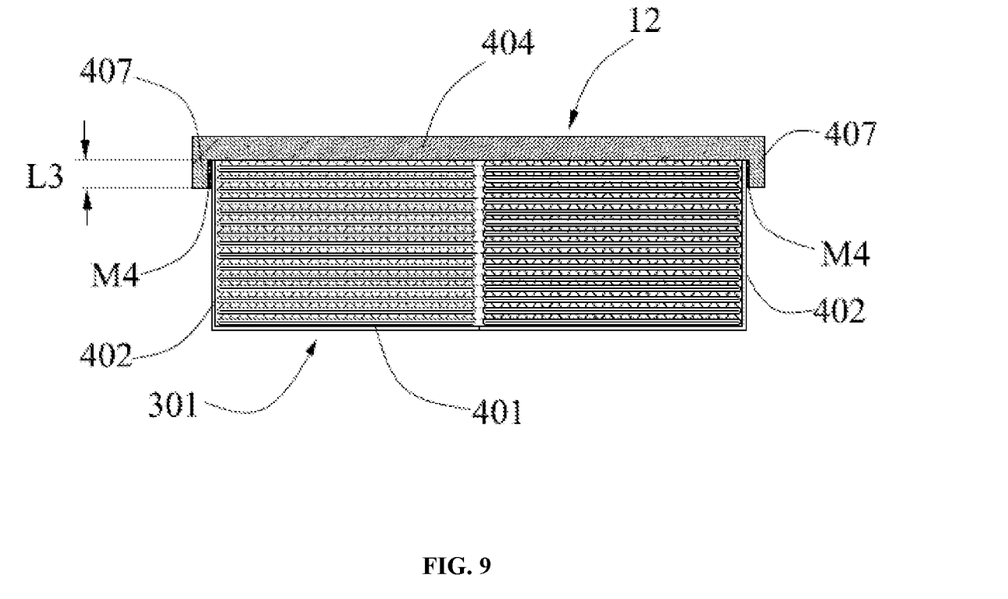
FIG. 9 is a fourth schematic view of the connection structure of the first mounting shell and the cover provided by an embodiment of the present disclosure.

The present disclosure also provides another implementation of the cover 12 as shown in FIG. 9. The cover 12 includes a second connecting wall 404 and two second side walls 407. The two second side walls 407 are connected to the second connecting wall 404 along the length direction of the heat exchange core 100, and the two second side walls 407 are distributed on two opposite sides of the second connecting wall 404 in the width direction. The second side wall 407 is substantially perpendicular to the second connecting wall 404.

The first connecting wall 401 and the second connecting wall 404 are at least partially arranged opposite to each other. In the circumferential direction of the outer shell, the size of the first side wall 402 is larger than the size of the second side wall 407. The two first side walls 402 and the two second side walls 407 are correspondingly matched respectively, wherein, the second side wall 407 is overlapped with a side of the first side wall 402 away from the heat exchange core 100 by means of bonding. A fourth adhesive area is formed by at least part area of the second side wall 407 facing the first side wall 402. The glue attached to the fourth adhesive area is marked as M4, which can refer to the black filled area between the first side wall 402 and the second side wall 407 in FIG. 9. The glue M4 may be coated on the fourth adhesive area, or on a surface of the first side wall 402 facing the fourth adhesive area.

Since both the first mounting shell 301 and the cover 12 have a certain wall thickness, when assembling by means of overlap, by overlapping the shorter side wall to a side of the longer side wall away from the heat exchange core 100, the area where the height difference is leaded and influenced by the wall thickness of the shell is less, which can reduce the problem of the waste of glue material caused by filling the height difference.

In the circumferential direction of the outer shell, the length of the second side wall 407 is greater than or equal to 3 mm, and the length L3 of overlapping area between the second side wall 407 and the first side wall 402 is greater than or equal to 3 mm. The relatively large bonding surface size is beneficial to improve the reliability of the bonding of heat exchanger products. The first side wall 402 abuts against the second connecting wall 404, and the inner side wall of the outer shell forms a substantially regular rectangular cavity.

When bonding the first mounting shell 301 and the cover 12, butting surfaces on both sides of the bonding glue may be full planes, by which the gluing process is simple and quick, and is suitable for automated production. The butting surfaces on both sides of the bonding glue may also be connected to uneven tongued and grooved surfaces, which is beneficial to improve the connection strength.

Furthermore, as shown in FIG. 2, the end of the cover 12 close to the mounting end plate 203 is provided with a third flange portion 600 extending in a direction away from the heat exchange core 100. The side surface of the third flange portion 600 facing the mounting end plate 203 is hermetically connected to the mounting end plate 203 by bonding.

For the mounting end plate 203, it is connected to the first mounting shell 301 by welding, and is connected to the cover 12 by bonding. Since the first mounting shell 301 and the mounting end plate 203 are connected by welding, in order to facilitate welding and improve the welding strength, an end of the first mounting shell 301 close to the mounting end plate 203 may also extend in the direction away from the heat exchange core 100 so as to form a fourth flange portion. A complete annular flange may be formed by matching the third flange portion 600 and the fourth flange portion. Of course, due to relatively small limitation on the size of the welding surface in the brazing method, the first mounting shell 301 may not be provided with the fourth flange portion, and the first mounting shell 301 and the mounting end plate 203 are directly fixed by brazing, on which the present disclosure does not define too much limitations.

When the cover 12 and the mounting end plate 203 are bonded, the abutting surfaces on both sides of the bonding glue may be full planes, by which the gluing process is simple and quick, and is suitable for automated production. The butting surfaces on both sides of the bonding glue may also be connected by tongued and grooved surfaces, which is beneficial to improve the connection strength.

Figure 10:
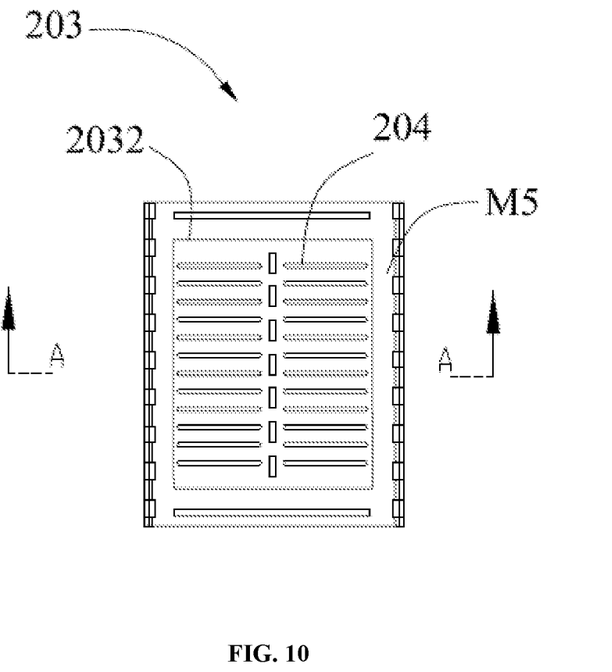
FIG. 10 is a schematic structural view of a mounting end plate provided by an embodiment of the present disclosure.
Figure 11:
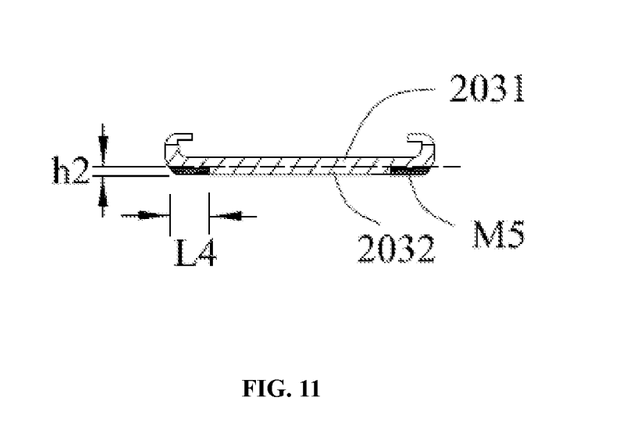
FIG. 11 is a schematic structural cross-sectional view of the mounting end plate taken along direction A-A of FIG. 10.

As shown in FIGS. 10 and 11, in the thickness direction of the mounting end plate 203, the mounting end plate 203 includes a first plate portion 2031 and a second boss 2032 which are integrally connected. The insertion hole 204 extends through the second boss 2032 and the first plate portion 2031. The second boss 2032 protrudes toward a side of the heat exchange core 100 relative to the first plate portion 2031. The first plate portion 2031 and the third flange portion 600 are hermetically combined by bonding. A fifth adhesive area is formed by part area of the first plate portion 2031 corresponding to a periphery of the second boss 2032. The glue attached to the fifth adhesive area is marked as M5, which can refer to the black filled area in FIG. 11.

The height h2 of the second boss 2032 is 0.1 mm to 1 mm, and relatively preferably, is 0.3 mm to 0.5 mm. In a direction perpendicular to the thickness of the mounting end plate, that is, in a direction in which the surface of the mounting end plate extends, the length L4 of the first plate portion 2031 beyond the second boss 2032 is greater than or equal to 3 mm. The second boss 2032 is beneficial to prevent the glue M5 in the fifth adhesive area from overflowing into the cavity of the outer shell. When processing and installing the end plate 203, an annular notch may be cut at the edge of the plate with a certain thickness in a vertical thickness direction. A second boss 2032 is formed on an inner side of the annular notch. The first plate portion 2031 is formed on the other side of the plate without the annular notch.

Furthermore, the material of the cover 12 is a metallic material or a non-metallic material. The heat exchange core 100, the mounting end plate 203 and the first mounting shell 301 may be brazed at high temperature. Under conditions of the brazing process, materials of the heat exchange core 100, the mounting end plate 203 and the first mounting shell 301 need to be metallic materials. The heat exchange core 100, the mounting end plate 203 and the first mounting shell 301 may be made of aluminum or aluminum alloy. The cover 12 and the first mounting shell 301, and the cover 12 and the mounting end plate 203 are combined by bonding. The cover 12 does not need to undergo a high-temperature brazing process, so that selection of material of the cover 12 may be more flexible. The materials of the cover 12, the heat exchange core 100, the mounting end plate 203 and the first mounting shell 301 may be the same, or may be other different materials. The material of the cover 12 may be metallic materials, such as aluminum, aluminum alloy, copper, copper-aluminum alloy, or stainless steel, or non-metallic materials, such as rubber or plastic. The technical solution provided in the present disclosure is beneficial to extend material types of the cover 12, enrich product types and application scenarios of heat exchanger products, and has advantages in cost-effective options and lightweight options.

Average thickness of the cover 12 may be similar to that of the first mounting shell 301, or average thickness of the cover 12 may be greater than average thickness of the shell of the first mounting shell 301, which is beneficial to improve deformation resistance of the cover 12 under high fluid pressure and improve product stability, especially when the material of the cover 12 is plastic, etc.

Compared with the way that all components of the heat exchanger are fixed by welding, since the first mounting shell 301 is a semi-enclosing type shell relative to the heat exchange core 100, when brazing the main body portion as a whole, the heat of the brazing process may directly act on the heat exchange core 100, the collecting pipe portion and the first mounting shell 301. In particular, the heat of the heat exchange core is more controllable and more accurate, which is beneficial to avoid leakage of the first medium flow area which is partially leaded by inconsistent brazing temperature of inside and outside of the heat exchanger outer shell of the heat exchange core. As for the cover 12, the cover 12 is connected to the first mounting shell 301 and the mounting end plate 203 by bonding. The cover 12 is not susceptible to high temperature deformation due to the influence of the brazing process. The second medium flow area enclosed by the cover 12, the first mounting shell 301 and the mounting end plate 203 is not prone to leakage.

The first medium may be a refrigerant. Correspondingly, the second medium is a coolant. The bonding between the cover 12 and the first mounting shell 301 and that between the cover 12 and the mounting end plate 203 are suitable for the coolant side fluid with relatively low pressure, and the heat exchange tube 101 and the collecting pipe portion fixed by the brazing process are still used for relatively high pressure refrigerant side fluid, which is beneficial to improve flow reliability of the two fluids. Size design based on the bonding area and glue thickness design of the gluing area, are beneficial to compact structure of the heat exchanger, which can meet the needs of lightweight and high efficiency.

The glues M1 to M5 used in the bonding method of the embodiment of the present disclosure may all be high-strength epoxy-based two-component structural glue or single-component sealing structural glue. Both high-strength epoxy-based two-component structural glue and single-component sealing structural glue have certain corrosion resistance, which is beneficial to improve corrosion resistance of heat exchanger products. The gluing thickness of the sealing structural glue is 0.1 mm to 0.5 mm, and the relatively preferably, thickness is 0.2 mm to 0.3 mm.

The present disclosure also provides a manufacturing method of the heat exchanger. In an implementation provided in the present disclosure, the manufacturing method includes:

Step S101, providing the heat exchange core 100, the first collecting pipe portion 201, the second collecting pipe portion 202 and the first mounting shell 301;

The heat exchange core 100 includes at least one heat exchange tube 101. Each of the first collecting pipe portion 201 and the second collecting pipe portion 202 are formed with a mounting end plate 203 for fixed installation with the heat exchange tube 101. The mounting end plate 203 is provided with an insertion hole 204 adaptable to the heat exchange tube 101. One end of the heat exchange tube 101 is inserted into the insertion hole 204 provided on the mounting end plate 203 of the first collecting pipe section 201, and the other end of the heat exchange tube 101 is inserted into the insertion hole 204 provided on the mounting end plate 203 of the second collecting pipe section 202. And, the first mounting shell 301 is arranged in attached and arranged along the length direction of the heat exchange core 100.

Step S102, fixing the heat exchange core 100, the first collecting pipe portion 201, the second collecting pipe portion 202 and the first mounting shell 301 as a whole by brazing. A tube wall 103 of the heat exchange tube 101 is hermetically connected to the mounting end plate 203 at the insertion hole 204. The first mounting shell 301 is hermetically connected to the mounting end plate 203. The first mounting shell 301 is fixedly connected to the heat exchange core 100 along the length direction of the heat exchange core 100, wherein, the tube inner channel 102 of the heat exchange tube 101 is in communication with an inner cavity of the first collecting pipe portion 201 and an inner cavity of the second collecting pipe portion 202.

Step S103, providing the cover 12, hermetically connecting the cover 12 and the first mounting shell 301 along the length direction of the heat exchange core 100 by bonding, and hermetically connecting the cover 12 and the mounting end plate 203 by bonding. The cover 12 and the first mounting shell 301 are arranged in an enclosing manner along a circumferential direction of the heat exchange core 100.

The above descriptions are only preferred embodiments of the present disclosure, and are not used to limit the present disclosure. For those skilled in the art, the present disclosure may have various modifications and changes. Any modification, equivalent replacement, improvement, etc., made within the spirit and principles of the present disclosure shall be included in the protection scope of the present disclosure.

What is claimed is:

1. A heat exchanger, configured to exchange heat between a refrigerant and a coolant, comprising:
   a main body portion, comprising: a heat exchange core, a collecting pipe portion and a first mounting shell;
   the heat exchange core comprising a heat exchange tube, the heat exchange tube having a tube inner channel and a tube wall enclosing the tube inner channel;
   the collecting pipe portion comprising a first collecting pipe portion and a second collecting pipe portion, the first collecting pipe portion and the second collecting pipe portion being located on two sides of the heat exchange core along a length direction of the heat exchange core, respectively; each of the first collecting pipe portion and the second collecting pipe portion comprising a mounting end plate; the mounting end plate of the first collecting pipe portion and the mounting end plate of the second collecting pipe portion being hermetically connected to the heat exchange tube by brazing; the tube inner channel of the heat exchange tube being in communication with an inner cavity of the first collecting pipe portion and an inner cavity of the second collecting pipe portion so as to form a refrigerant path to circulate the refrigerant;
   the first mounting shell being of an integrally U-shaped configuration; the first mounting shell comprising a first connecting wall and two first side walls; the two first side walls extending from two sides of the first connecting wall, respectively, along a height direction of the heat exchange core; the first mounting shell comprising a first accommodating space and a first opening communicating with the first accommodating space; the first accommodating space being jointly formed by the first connecting wall and the two first side walls;
   the heat exchange core being received in the first accommodating space; two ends of the first mounting shell along the length direction of the heat exchange core being hermetically connected to the mounting end plate of the first collecting pipe portion and the mounting end plate of the second collecting pipe portion, respectively, by brazing; and
   a cover, assembled to the first mounting shell to cover the first opening;
   wherein two ends of the cover along the length direction of the heat exchange core being hermetically fixed to the mounting end plate of the first collecting pipe portion and the mounting end plate of the second collecting pipe portion, respectively, by glue; two sides of the cover, extending along the length direction of the heat exchange core, being hermetically fixed to the first mounting shell by glue; the cover and the first mounting shell being fixed in an enclosing manner along a circumferential direction of the heat exchange core;
   wherein the first mounting shell, the cover, the mounting end plate of the first collecting pipe portion and the mounting end plate of the second collecting pipe portion jointly form an inner chamber in which the heat exchange core resides; and the heat exchanger further comprises an inlet and an outlet; the inlet, the inner chamber and the outlet are in communication to form a second path to circulate the coolant, such that the refrigerant and the coolant are capable of exchanging heat;

wherein each of the first collecting pipe portion and the second collecting pipe portion comprises a curved end shell fixed to the mounting end plate; the inner cavity of the first collecting pipe portion is formed by the mounting end plate of the first collecting pipe portion and the curved end shell of the first collecting pipe portion; the inner cavity of the second collecting pipe portion is formed by the mounting end plate of the second collecting pipe portion and the curved end shell of the second collecting pipe portion;

wherein both the first collecting pipe portion and the second collecting pipe portion extend upwardly beyond the cover along the height direction of the heat exchange core; and wherein both the first collecting pipe portion and the second collecting pipe portion extend downwardly beyond the first connecting wall along the height direction of the heat exchange core.

2. The heat exchanger according to claim 1, wherein each heat exchange tube defines a plurality of channels which are arranged along a direction parallel to the first connecting wall.

3. The heat exchanger according to claim 1, wherein the inlet is provided on one of the two first side walls of the first mounting shell, and the outlet is provided on a remaining one of the two first side walls of the first mounting shell.

4. The heat exchanger according to claim 1, wherein the curved end shell of the first collecting pipe portion and the curved end shell of the second collecting pipe portion both extend beyond the first mounting shell and the cover.

5. The heat exchanger according to claim 1, wherein each of the first collecting pipe portion and the second collecting pipe portion defines two inner cavities;

the heat exchanger further comprises a first inlet pipe portion and a second inlet pipe portion which are fixed to the curved end shell of the first collecting pipe portion; the first inlet pipe portion defines a refrigerant inlet in communication with one of the two inner cavities of the first collecting pipe portion and a refrigerant outlet in communication with a remaining one of the two inner cavities of the first collecting pipe portion.

6. The heat exchanger according to claim 1, wherein the heat exchange core comprises a heat sink fixed to the tube wall of a topmost heat exchange tube; the heat sink is received in the first accommodating space and covered by the cover.

7. The heat exchanger according to claim 1, wherein each of the two ends of the cover along the length direction of the heat exchange core comprises a first flange which is hermetically fixed to the mounting end plate of the first collecting pipe portion and the mounting end plate of the second collecting pipe portion, respectively, by glue.

8. The heat exchanger according to claim 1, wherein each of the two ends of the first mounting shell along the length direction of the heat exchange core comprises a second flange which is hermetically connected to the mounting end plate of the first collecting pipe portion and the mounting end plate of the second collecting pipe portion, respectively, by brazing.

9. The heat exchanger according to claim 1, wherein the first mounting shell further comprises two first flange portions of which each is connected to a corresponding first side wall of the first mounting shell; each first flange portion extends from the corresponding first side wall in a direction away from the heat exchange core; and the cover comprises a second connecting wall and two extension portions connected to the second connecting wall; the two extension portions are located on different sides in a width direction of the heat exchange core, respectively; at least part of the heat exchange core is located between the first connecting wall and the second connecting wall; the two extension portions and the two first flange portions are at least partially disposed oppositely along the height direction of the heat exchange core; each extension portion is at least partially fixed to a corresponding first flange portion by glue.

10. The heat exchanger according to claim 9, wherein each extension portion is spaced apart from the corresponding first flange portion along the height direction of the heat exchange core so that a gap, configured to fill in a glue, is formed between each extension portion and the corresponding first flange portion.

11. The heat exchanger according to claim 10, wherein a bottom of the cover facing the heat exchange core is further provided with a first boss protruding downwardly beyond the two extension portions; the first boss is configured to abut against and be supported by the heat exchange core so as to main a height of the gap;

wherein a height of the first boss is 0.1 mm to 1 mm.

12. The heat exchanger according to claim 1, wherein a material of the cover is a non-metallic material, and a material of the main body portion is a metallic material, wherein the metallic material is aluminum or aluminum alloy.

13. The heat exchanger according to claim 1, wherein a glue located between the cover and the first mounting shell, and located between the cover and the mounting end plate is a high-strength epoxy-based two-component structural glue, or a high-strength epoxy-based single-component sealing structural glue, and a thickness of the glue is 0.1 mm to 0.5 mm.

14. The heat exchanger according to claim 13, wherein surfaces of the cover, the first mounting shell and the mounting end plate for contacting respectively with the glue are selected from one of a flat surface and an uneven tongued and grooved surface.

15. A manufacturing method of a heat exchanger, the heat exchanger being configured to exchange heat between a refrigerant and a coolant, the heat exchanger comprising:

a main body portion, comprising: a heat exchange core, a collecting pipe portion and a first mounting shell;

the heat exchange core comprising a heat exchange tube, the heat exchange tube having a tube inner channel and a tube wall enclosing the tube inner channel;

the collecting pipe portion comprising a first collecting pipe portion and a second collecting pipe portion, the first collecting pipe portion and the second collecting pipe portion being located on two sides of the heat exchange core along a length direction of the heat exchange core, respectively; each of the first collecting pipe portion and the second collecting pipe portion comprising a mounting end plate; the mounting end plate of the first collecting pipe portion and the mounting end plate of the second collecting pipe portion being hermetically connected to the heat exchange tube by brazing; the tube inner channel of the heat exchange tube being in communication with an inner cavity of the first collecting pipe portion and an inner cavity of the second collecting pipe portion so as to form a refrigerant path to circulate the refrigerant;

the first mounting shell being of an integrally U-shaped configuration; the first mounting shell comprising a first connecting wall and two first side walls; the two first side walls extending from two sides of the first connecting wall, respectively, along a height direction of the heat exchange core; the first mounting shell comprising a first accommodating space and a first opening communicating with the first accommodating space; the first accommodating space being jointly formed by the first connecting wall and the two first side walls;

the heat exchange core being received in the first accommodating space; two ends of the first mounting shell along the length direction of the heat exchange core being hermetically connected to the mounting end plate of the first collecting pipe portion and the mounting end plate of the second collecting pipe portion, respectively, by brazing; and a cover, assembled to the first mounting shell to cover the first opening;

wherein two ends of the cover along the length direction of the heat exchange core being hermetically fixed to the mounting end plate of the first collecting pipe portion and the mounting end plate of the second collecting pipe portion, respectively, by glue; two sides of the cover, extending along the length direction of the heat exchange core, being hermetically fixed to the first mounting shell by glue; the cover and the first mounting shell being fixed in an enclosing manner along a circumferential direction of the heat exchange core;

wherein the first mounting shell, the cover, the mounting end plate of the first collecting pipe portion and the mounting end plate of the second collecting pipe portion jointly form an inner chamber in which the heat exchange core resides; and the heat exchanger further comprises an inlet and an outlet; the inlet, the inner chamber and the outlet are in communication to form a second path to circulate the coolant, such that the refrigerant and the coolant are capable of exchanging heat;

the manufacturing method comprising following steps:

providing the heat exchange core, the first collecting pipe portion, the second collecting pipe portion and the first mounting shell; inserting one end of the heat exchange tube in the length direction of the heat exchange tube into an insertion hole provided on the mounting end plate of the first collecting pipe portion; inserting the other end of the heat exchange tube in the length direction into an insertion hole provided on the mounting end plate of the second collecting pipe portion; and arranging the first mounting shell in close contact with the heat exchange core along the length direction of the heat exchange core;

fixing the heat exchange core, the first collecting pipe portion, the second collecting pipe portion and the first mounting shell as a whole by brazing; and after the brazing is done, providing the cover and hermetically fixing the cover to the first mounting shell, the mounting end plate of the first collecting pipe portion and the mounting end plate of the second collecting pipe portion by glue.

16. The manufacturing method of the heat exchanger according to claim 15, wherein the first mounting shell further comprises two first flange portions of which each is connected to a corresponding first side wall of the first mounting shell; each first flange portion extends from the corresponding first side wall in a direction away from the heat exchange core; and the cover comprises a second connecting wall and two extension portions connected to the second connecting wall; the two extension portions are located on different sides in a width direction of the heat exchange core, respectively; at least part of the heat exchange core is located between the first connecting wall and the second connecting wall; the two extension portions and the two first flange portions are at least partially disposed oppositely along the height direction of the heat exchange core; each extension portion is at least partially fixed to a corresponding first flange portion by glue.

17. The manufacturing method of the heat exchanger according to claim 16, wherein each extension portion is spaced apart from the corresponding first flange portion along the height direction of the heat exchange core so that a gap, configured to fill in a glue, is formed between each extension portion and the corresponding first flange portion;

wherein a bottom of the cover facing the heat exchange core is further provided with a first boss protruding downwardly beyond the two extension portions; the first boss is configured to abut against and be supported by the heat exchange core so as to main a height of the gap.

* * * * *